(12) United States Patent
Kawakami et al.

(10) Patent No.: US 11,855,298 B2
(45) Date of Patent: Dec. 26, 2023

(54) CELL MODULE

(71) Applicant: SANYO Electric Co., Ltd., Osaka (JP)

(72) Inventors: Satoshi Kawakami, Hyogo (JP);
Takeshi Hashimoto, Nara (JP);
Haruhiko Yoneda, Osaka (JP); Masaya Nakano, Osaka (JP); Takao Takatsu, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 498 days.

(21) Appl. No.: 17/048,164

(22) PCT Filed: Apr. 5, 2019

(86) PCT No.: PCT/JP2019/015053
§ 371 (c)(1),
(2) Date: Oct. 16, 2020

(87) PCT Pub. No.: WO2019/208157
PCT Pub. Date: Oct. 31, 2019

(65) Prior Publication Data
US 2021/0167453 A1    Jun. 3, 2021

(30) Foreign Application Priority Data

Apr. 24, 2018 (JP) .................. 2018-083309

(51) Int. Cl.
*H01M 50/244* (2021.01)
*H01M 50/213* (2021.01)
(Continued)

(52) U.S. Cl.
CPC ....... *H01M 50/244* (2021.01); *H01M 50/204* (2021.01); *H01M 50/207* (2021.01);
(Continued)

(58) Field of Classification Search
CPC ............ H01M 50/244; H01M 50/213; H01M 50/204; H01M 50/207; H01M 50/262; H01M 50/289
See application file for complete search history.

(56) References Cited

U.S. PATENT DOCUMENTS

2012/0021260 A1* 1/2012 Yasui ................. H01M 10/653
429/71
2014/0283360 A1    9/2014 Takeda et al.
2017/0301964 A1* 10/2017 Murakami .......... H01M 10/643

FOREIGN PATENT DOCUMENTS

JP    2010-009798    1/2010

OTHER PUBLICATIONS

International Search Report of PCT application No. PCT/JP2019/015053 dated Jun. 18, 2019.
(Continued)

*Primary Examiner* — Jonathan G Jelsma
(74) *Attorney, Agent, or Firm* — WHDA, LLP

(57) ABSTRACT

A cell module includes a plurality of cylindrical batteries and a holder composed by arranging each of cylindrical batteries in a parallel posture. The holder includes: a holder body having holding spaces for arranging cylindrical batteries at fixed positions; and a sub holder stacked on the holder body. The holder body has stopper portions deformed toward surfaces of cylindrical batteries arranged in holding spaces. The sub holder has push rods that push out stopper portions to cylindrical batteries in a state of being coupled to the holder body. In a state in which the sub holder is coupled to the holder body, in the cell module, the push rods thrust stopper portions against cylindrical batteries, and press the surfaces of cylindrical batteries arranged in holding spaces.

14 Claims, 16 Drawing Sheets

(51) Int. Cl.
*H01M 50/289* (2021.01)
*H01M 50/262* (2021.01)
*H01M 50/207* (2021.01)
*H01M 50/204* (2021.01)
*H01M 50/271* (2021.01)

(52) U.S. Cl.
CPC ....... *H01M 50/213* (2021.01); *H01M 50/262* (2021.01); *H01M 50/271* (2021.01); *H01M 50/289* (2021.01)

(56) References Cited

OTHER PUBLICATIONS

The Extended European Search Report dated Apr. 26, 2021, issued in counterpart EP Application No. 19792855.9. (7 pages).

* cited by examiner

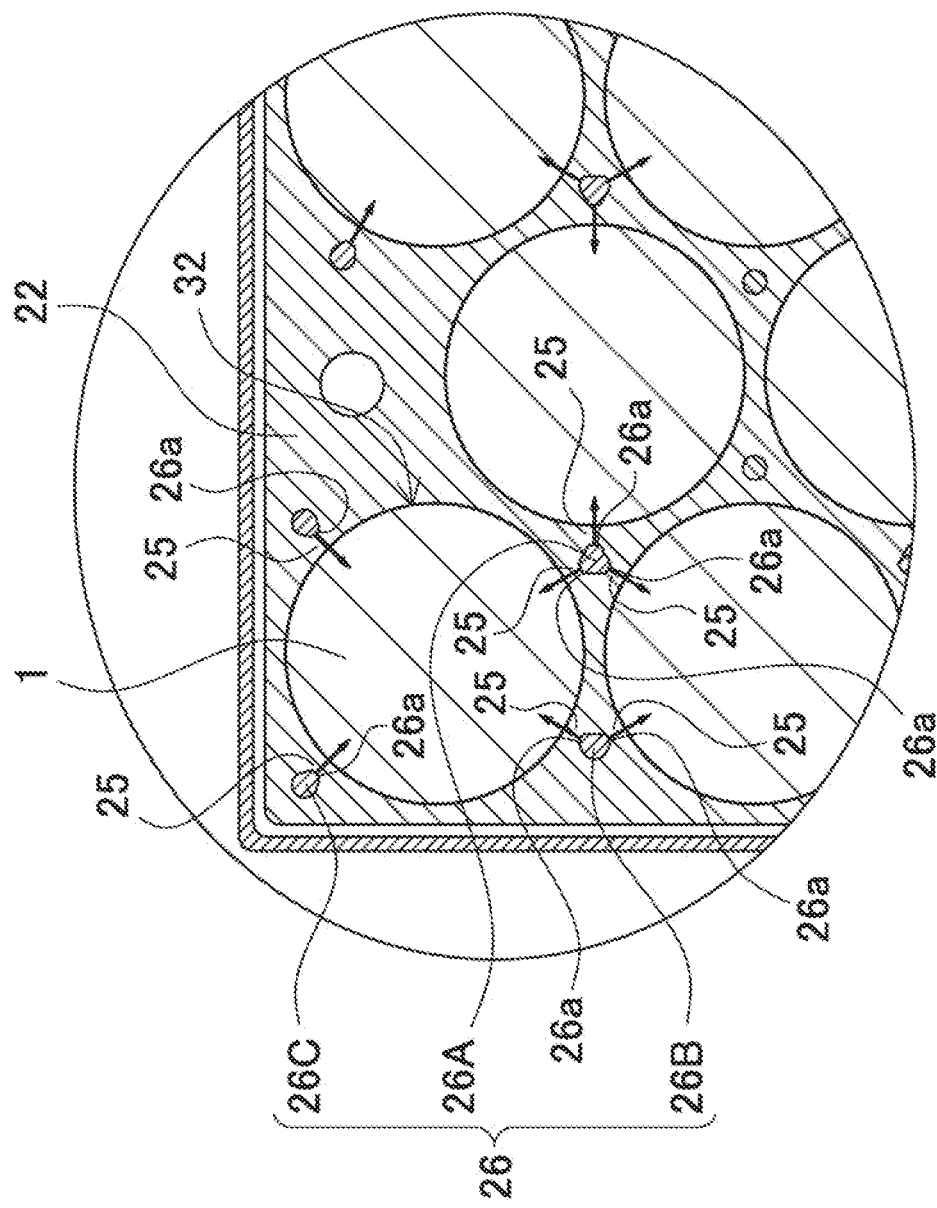

CELL MODULE

CROSS-REFERENCE TO RELATED APPLICATIONS

This application is a U.S. national stage application of the PCT International Application No. PCT/JP2019/015053 filed on Apr. 5, 2019, which claims the benefit of foreign priority of Japanese patent application No. 2018-083309 filed on Apr. 24, 2018, the contents all of which are incorporated herein by reference.

TECHNICAL FIELD

The present invention relates to a cell module in which cylindrical batteries are arranged at fixed positions by a holder, and particularly to a cell module composed by disposing a holder so as to inhibit positional shifts of cylindrical batteries and prevent/suppress the cylindrical batteries from rotating.

BACKGROUND ART

A cell module has been developed in which a plurality of cylindrical batteries are placed in holding spaces of a holder and arranged in a parallel posture. In this cell module, it is important to inhibit the cylindrical batteries from rotating and to arrange the cylindrical batteries at fixed positions of the holder. This is because, when the cylindrical batteries rotate, a unreasonable load may act on a joint of each of the batteries to a metal-sheet bus bar that connects the batteries in series or in parallel to one another, and a harmful effect such as a breakage may occur. A cell module has been developed that inhibits the cylindrical batteries from rotating and arranges the cylindrical batteries in the holding spaces of the holder. (See PTL 1)

CITATION LIST

Patent Literature

PTL 1: Unexamined Japanese Patent Publication No. 2010-9798

SUMMARY OF THE INVENTION

In the cell module in which the cylindrical batteries are arranged in the holder so as not to rotate, stopper portions that are brought into contact with surfaces of the batteries are provided in the holder, and the stopper portions are thrust against the cylindrical batteries inserted into the holder, and inhibit the cylindrical batteries from rotating. In this cell module, the cylindrical batteries cannot be smoothly inserted into the holding space of the holder. This is because the stopper portions are thrust against the surfaces of the cylindrical batteries inserted into the holder to increase frictional resistance between the cylindrical batteries and the stopper portions. In particular, the cell module has a drawback that, if the stopper portions are strongly thrust against the surfaces of the cylindrical batteries in order to surely inhibit the cylindrical batteries from rotating, then the frictional resistance will increase, and it becomes more and more impossible to smoothly insert the cylindrical batteries into the holder.

The present invention has been developed for the purpose of eliminating the above drawback. One of the objects of the present invention is to provide a cell module that, while achieving a structure in which the cylindrical batteries can be smoothly inserted into the holder, can surely inhibit positional shifts of the cylindrical batteries, and can prevent/suppress the cylindrical batteries from rotating.

A cell module of the present invention includes a plurality of cylindrical batteries 1 and holder 2, 20 composed by arranging respective cylindrical batteries 1 in a parallel posture. Holder 2, 20 includes: holder body 3, 23 having holding spaces 13, 33 for arranging cylindrical batteries 1 at fixed positions; and sub holder 4, 24 stacked on holder body 3, 23. Holder body 3, 23 has stopper portions 5, 25 deformed toward surfaces of cylindrical batteries 1 arranged in holding spaces 13, 33. Sub holder 4, 24 has push rods 6, 26 that push out stopper portions 5, 25 to cylindrical batteries 1 in a state of being coupled to holder body 3, 23. In a state in which sub holder 4, 24 is coupled to holder body 3, 23, in the cell module, push rods 6, 26 thrust stopper portions 5, 25 against cylindrical batteries 1, and press the surfaces of cylindrical batteries 1 arranged in holding spaces 13, 33.

The cell module of the present invention can have a structure in which, in the state in which sub holder 4, 24 is coupled to holder body 3, 23, push rods 6, 26 are inserted into back surfaces of stopper portions 5, 25, press stopper portions 5, 25 from the back surfaces, and thrust and press front surfaces of stopper portions 5, 25 against cylindrical batteries 1.

In the cell module of the present invention, the front surfaces of stopper portions 5, 25 can be curved surfaces 5*a*, 25*a* that go along the surfaces of cylindrical batteries 1.

In the cell module of the present invention, push rods 6, 26 of sub holders 4, 24 can have protrusions 6*a*, 26*a* that locally push out the back surfaces of stopper portions 5, 25.

In the cell module of the present invention, each of pressed surfaces in which the back surfaces of stopper portions 5 are pressed by protrusions 6*a* provided on push rods 6 can be formed into a flat shape.

In the cell module of the present invention, stopper portions 5 can be formed as elastic arms 5A deformed and pressed against cylindrical batteries 1, and holder body 3 can be made of plastic composed by integrally molding elastic arms 5A.

In the cell module of the present invention, holder body 3 can be provided with insertion spaces 14 in each of which an entire shape is a substantially triangular prism shape, each of insertion spaces 14 being provided in a region surrounded by three cylindrical batteries 1 arranged in adjacent columns where the plurality of cylindrical batteries 1 are arranged in a bale stack and between cylindrical batteries 1 arranged in the same column, cylindrical cell 1 in an adjacent column is arranged, and between each of insertion spaces 14 and each of cylindrical batteries 1, two stopper portions 5 that push out surfaces of two cylindrical batteries 1 can be arranged as a pair of stopper portions 5 in an inverse V shape in plan view, and can be integrally coupled to holder body 3.

In the cell module of the present invention, holder body 3 can be provided with separation slits 15 along both side edges of stopper portions 5, each of separation slits 15 separating the pair of stopper portions 5 from holder body 3.

In the cell module of the present invention, between each of insertion spaces 14 and cylindrical batteries 1, two of stopper portions 5 that press the surfaces of two cylindrical batteries 1 and cover portion 7 that covers the surface of one cylindrical cell 1 can be provided integrally with holder body 3, and cover portion 7 can have both side edges integrally coupled to holder body 3.

In the cell module of the present invention, in three cylindrical batteries 1 arranged around insertion space 14, two cylindrical batteries 1 pressed by stopper portions 5 can be connected in parallel to each other, and cylindrical batteries 1 pressed by stopper portions 5 and cylindrical cell 1 arranged inside cover portion 7 can be connected in series to each other.

Moreover, the cell module of the present invention can have a structure in which holder body 23 includes rubbery holder 22 formed by molding a rubbery elastic body, rubbery holder 22 has holding spaces 33 for arranging cylindrical batteries 1, and insertion spaces 34 for push rods 26, portions between insertion spaces 34 and surfaces of rubbery holder 22, the surfaces facing cylindrical batteries 1, are defined as elastically deformable stopper portions 25, push rods 26 are inserted into insertion spaces 34, and push rods 26 thrust and press elastically deformed stopper portions 25 against the surfaces of cylindrical batteries 1.

Furthermore, in the cell module of the present invention, holder body 23 can have a stacked structure of rubbery holder 22 and plastic holder 21.

Moreover, in the cell module of the present invention, an inner surface of each of holding spaces 33 can have a cylindrical shape that goes along the surface of each of cylindrical batteries 1, an outer shape of each of push rods 26 can be made larger than an inner shape of each of insertion spaces 34, push rods 26 can be inserted into insertion spaces 34, and stopper portions 5 can be elastically deformed and thrust against the surfaces of cylindrical batteries 1.

Furthermore, in the cell module of the present invention, push rods 26 can have protrusions 26a that protrude toward cylindrical batteries 1 arranged to face stopper portions 25.

Advantageous Effects of Invention

Although the cylindrical batteries of the present invention can be smoothly inserted into the holder and assembled efficiently, the cell module has features that the positional shifts of the cylindrical batteries arranged at fixed positions by the holder can be surely inhibited, and that the cylindrical batteries can be prevented/suppressed from rotating. A reason for the above is as follows. In the above cell module, the holder is composed of the holder body and the sub holder, the holder body is provided with the stopper portions deformed toward the surfaces of the cylindrical batteries arranged in the holding spaces, the sub holder is provided with the push rods that push out the stopper portions to the cylindrical batteries in a state in which the sub holder is coupled to the holder body, the sub holder is coupled to the holder body, and the stopper portions are thrust against the cylindrical batteries by the push rods, and press the surfaces of the cylindrical batteries arranged in the holding spaces. In the power source module having this structure, after the cylindrical batteries are inserted into the holder, the sub holder is coupled to the holder body, and the stopper portions are strongly thrust against the surfaces of the cylindrical batteries by the push rods of the sub holder. Accordingly, it is not necessary to strongly thrust the stopper portions against the surfaces of the cylindrical batteries in a state of inserting the cylindrical batteries, and the cylindrical batteries can be smoothly inserted into the holder. In a state in which the cylindrical batteries are arranged at fixed positions of the holder, the stopper portions can be pressed against the surfaces of the cylindrical batteries by the push rods of the sub holder to increase the frictional resistance, so the positional shifts of the cylindrical batteries can be surely inhibited, and the cylindrical batteries can be prevented/suppressed from rotating.

Moreover, the cell module of the present invention also achieves a feature that the sub holder and the holder body can be coupled to each other at a fixed position in a state of causing no positional shift since the sub holder is coupled to the holder body via the push rods.

BRIEF DESCRIPTION OF DRAWINGS

FIG. 16 is an enlarged cross-sectional view of a main part of the holder illustrated in FIG. 12.

DESCRIPTION OF EMBODIMENTS

Figure 1:
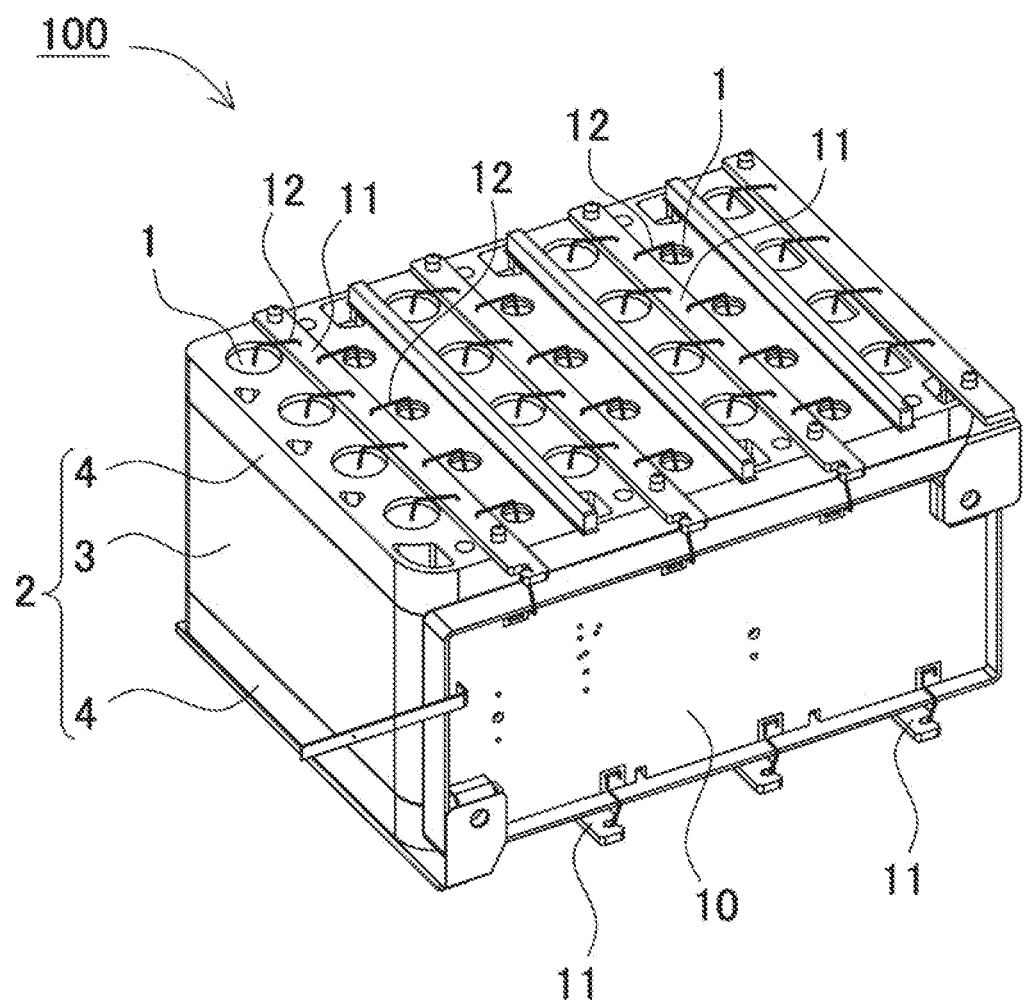
FIG. 1 is a perspective view of a cell module according to a first exemplary embodiment of the present invention.

Hereinafter, the present invention will be described in detail with reference to the drawings. In the following description, terms (for example, "top", "bottom", and other terms including those terms) indicating specific directions or positions are used as necessary; however, the use of those terms is for facilitating the understanding of the invention referring to the drawings, and the technical scope of the present invention is not limited by the meanings of the terms. Moreover, portions having the same reference numerals, which appear in a plurality of drawings, indicate the same or equivalent portions or members.

Furthermore, the exemplary embodiments described below illustrate specific examples of the technical idea of the present invention, and do not limit the present invention to the following. Further, dimensions, materials, shapes, relative arrangements and the like of components described below are not intended to limit the scope of the present invention only thereto unless specifically stated, and are intended to be merely exemplified. Moreover, contents described in one embodiment and one example are also applicable to other embodiments and examples. Furthermore, sizes, positional relationships and the like of members illustrated in the drawings may sometimes be exaggerated in order to clarify the explanation.

Figure 2:
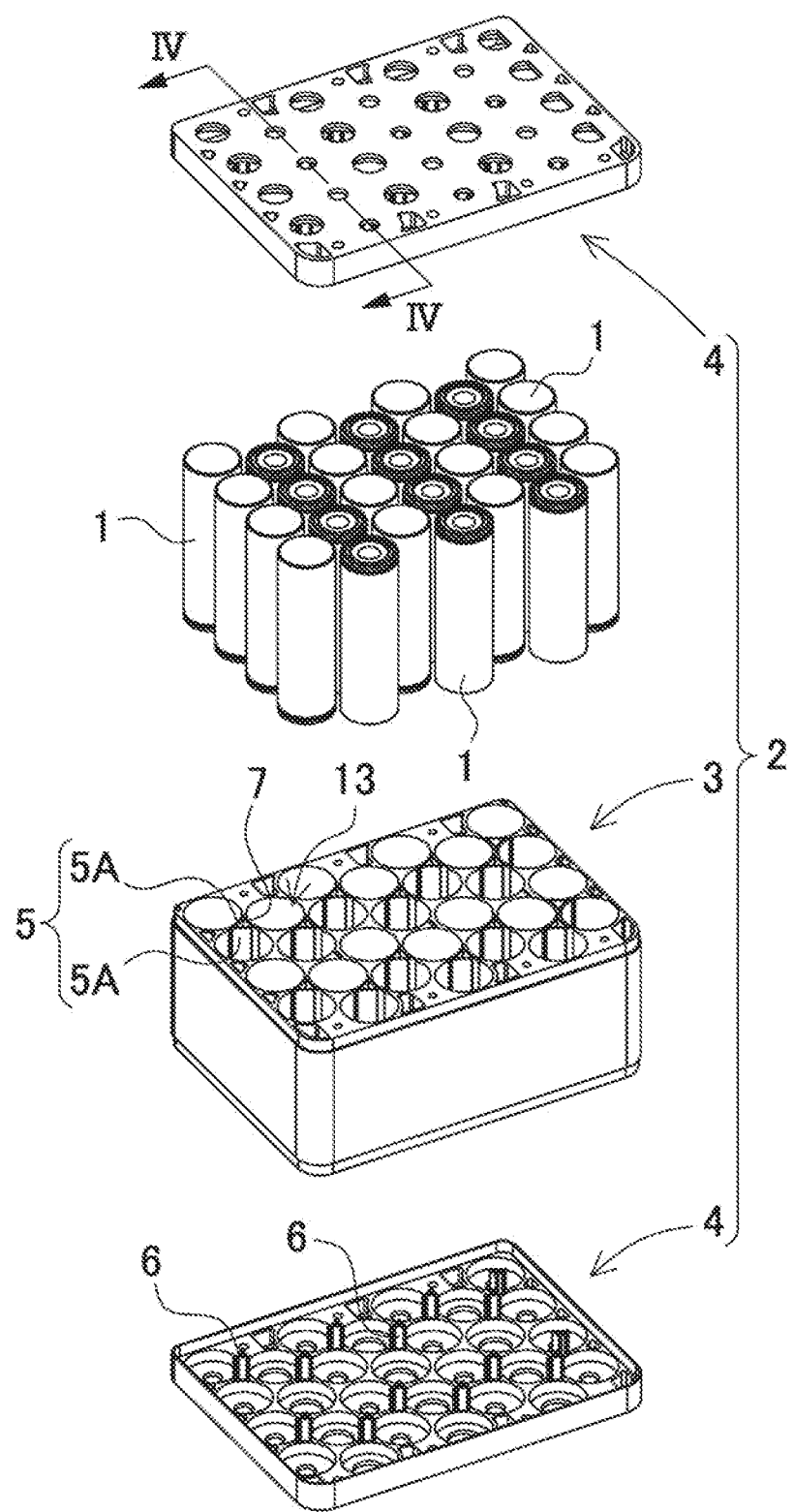
FIG. 2 is an exploded perspective view of a holder of the cell module illustrated in FIG. 1.
Figure 3:
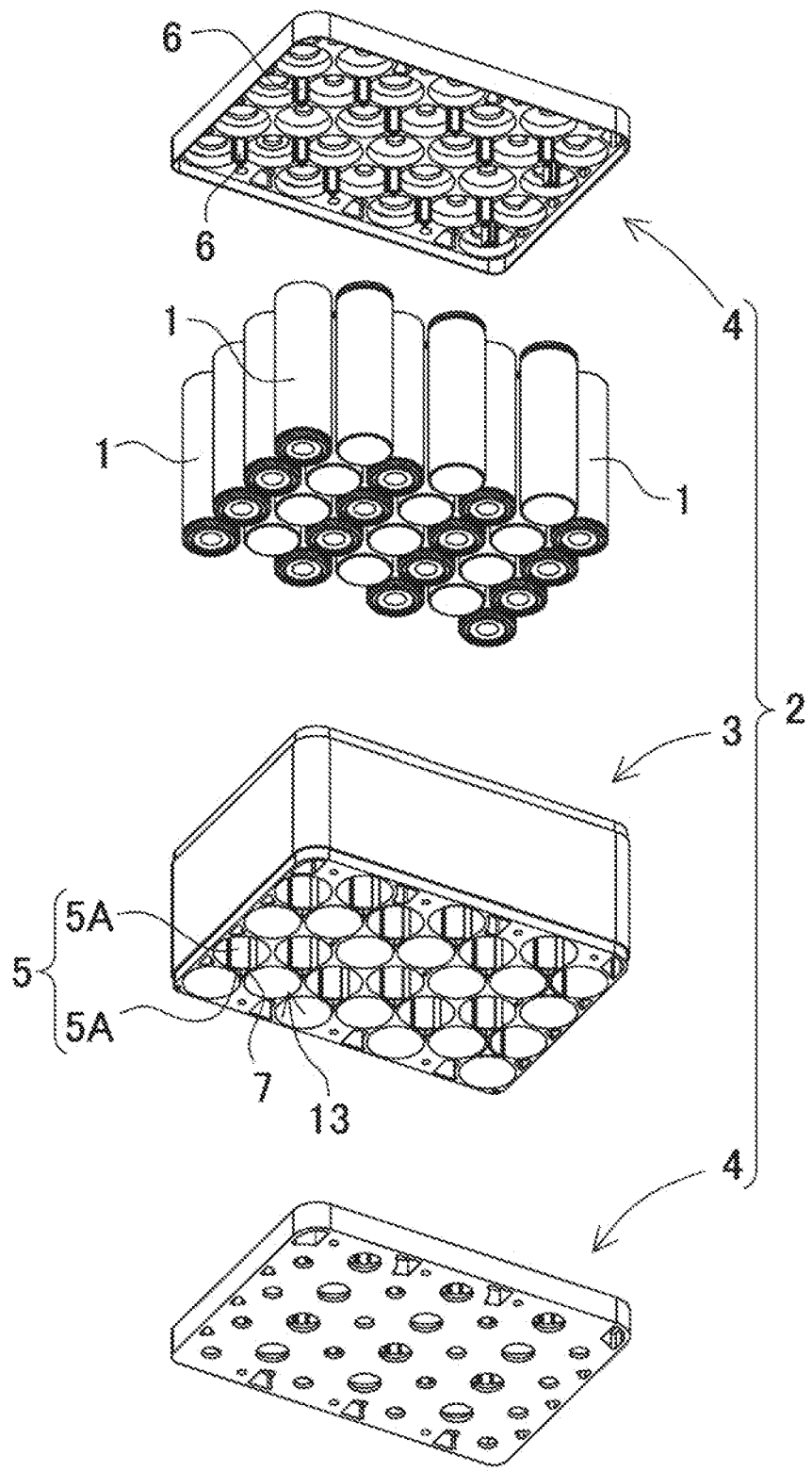
FIG. 3 is an exploded perspective view of the holder illustrated in FIG. 2 as viewed from below.
Figure 4:
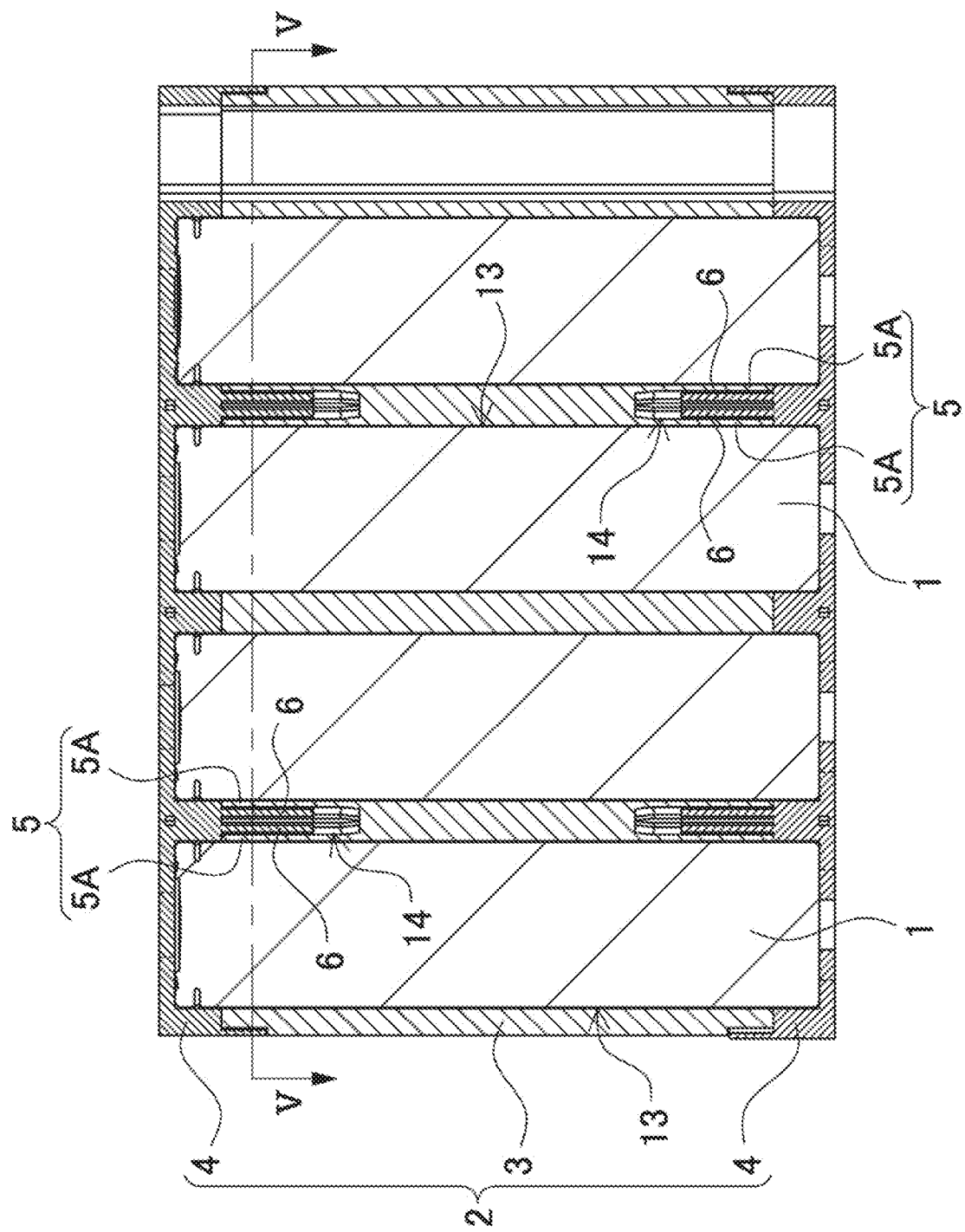
FIG. 4 is a vertical sectional view of the holder that accommodates cylindrical batteries, corresponding to a cross section taken along line IV-IV of FIG. 2.
Figure 5:
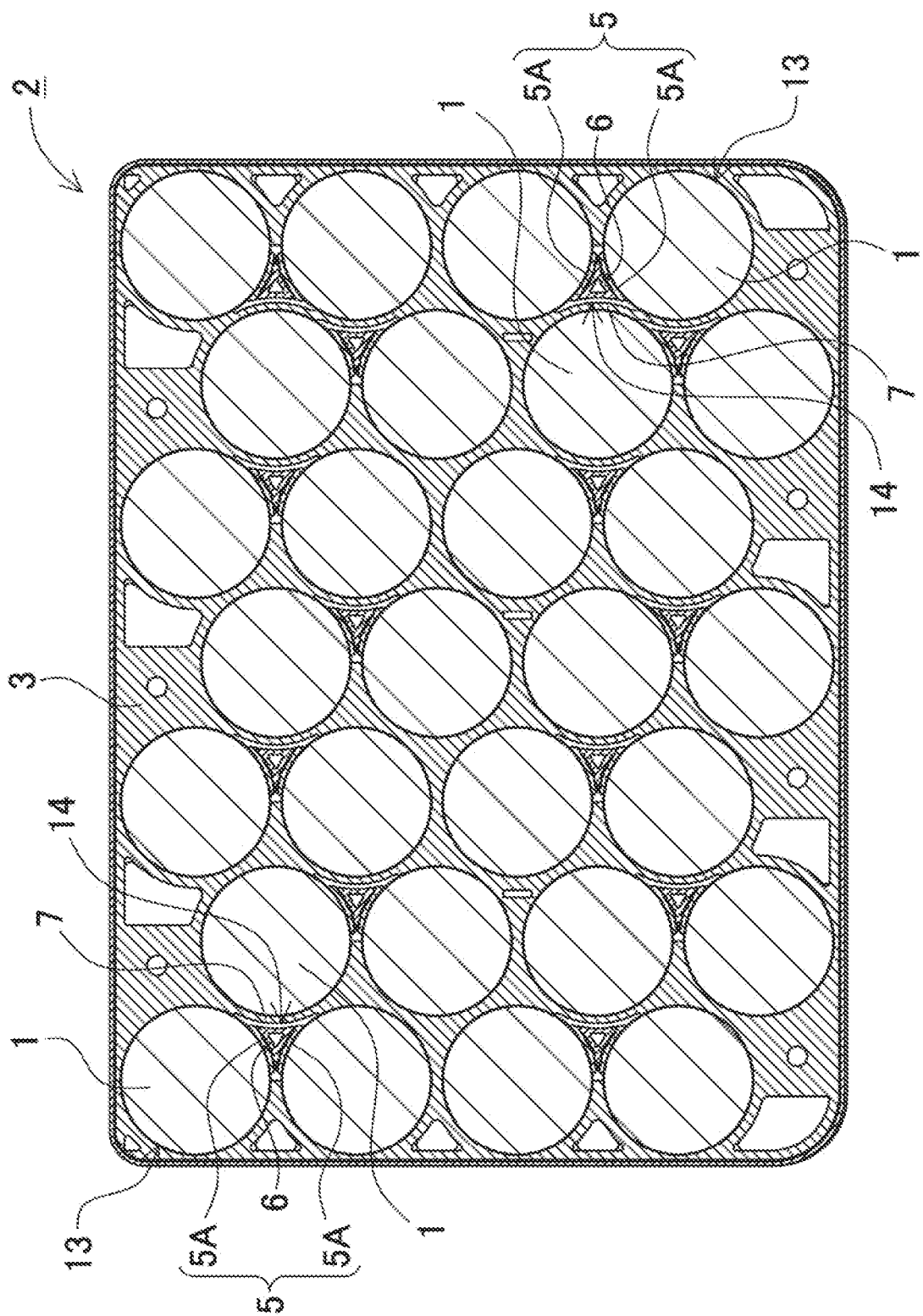
FIG. 5 is a cross-sectional view taken along line V-V of the holder illustrated in FIG. 4.

A cell module according to an exemplary embodiment of the present invention is illustrated in FIGS. 1 to 5. In these drawings, FIG. 1 illustrates a perspective view of the cell module, FIG. 2 illustrates an exploded perspective view of the cell module illustrated in FIG. 1, FIG. 3 illustrates an exploded perspective view of the cell module of FIG. 2 as viewed from below, FIG. 4 illustrates a vertical sectional view of the cell module of FIG. 1, and FIG. 5 illustrates a horizontal sectional view of the cell module of FIG. 1. Cell module 100 illustrated in FIGS. 1 to 5 includes: a plurality of cylindrical batteries 1; holder 2 in which cylindrical batteries 1 are arranged in a parallel posture; bus bars 11 that connect cylindrical batteries 1 in series and in parallel to one another; and circuit board 10 that mounts thereon a protection circuit of cylindrical batteries 1.

Holder 2 includes: holder body 3 having holding spaces 13 for cylindrical batteries 1; and sub holders 4 stacked on holder body 3. Holder body 3 is provided with stopper portions 5 deformed toward surfaces of cylindrical batteries 1 arranged in holding spaces 13. Each sub holder 4 has push rods 6 that push out stopper portions 5 to cylindrical batteries 1 in a state of being coupled to holder body 3. In a state where sub holder 4 is coupled to holder body 3, push rods 6 thrust stopper portions 5 against cylindrical batteries 1, press the surfaces of cylindrical batteries 1 in holding spaces 13, inhibit positional shifts of cylindrical batteries 1, and prevent/suppress cylindrical batteries 1 from rotating.

Figure 6:
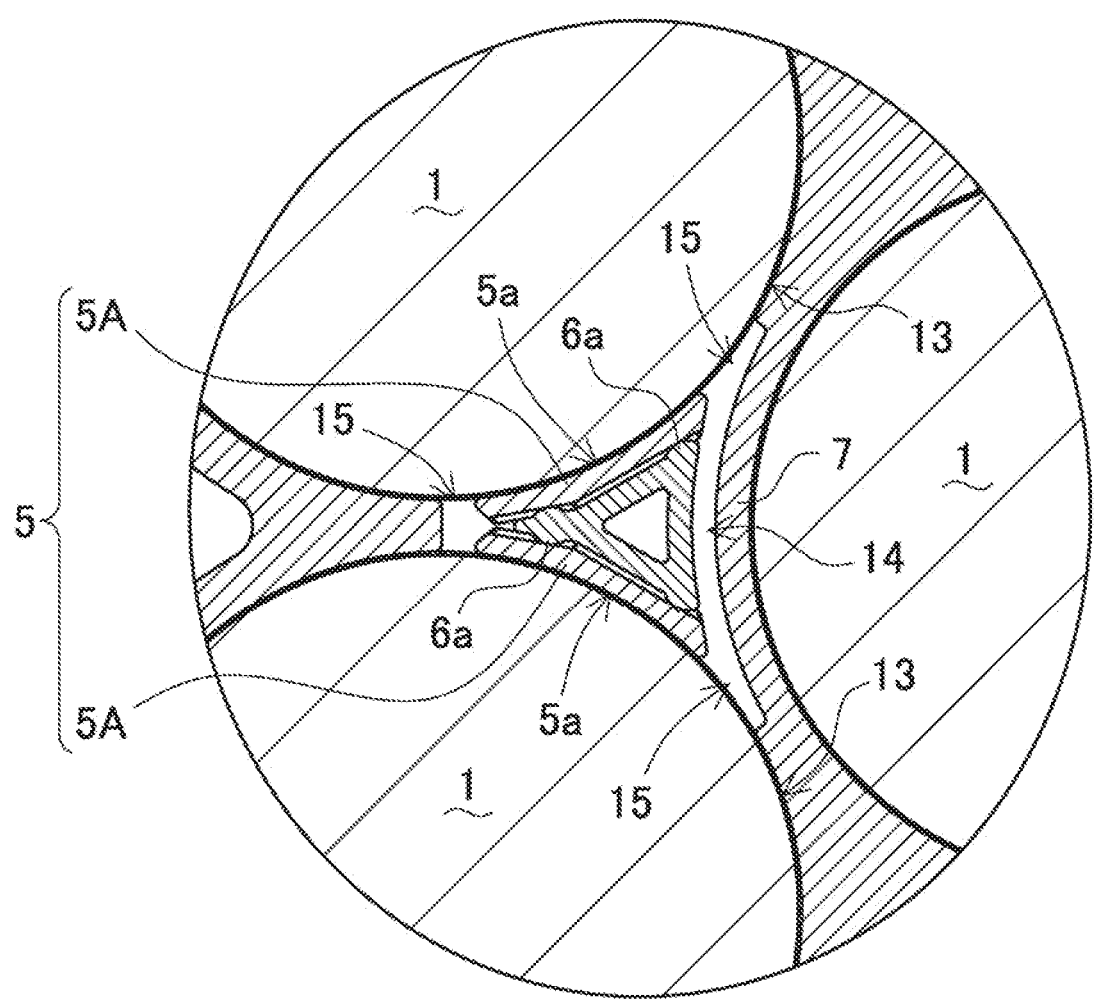
FIG. 6 is an enlarged cross-sectional view of a main part of the holder illustrated in FIG. 5.
Figure 7:
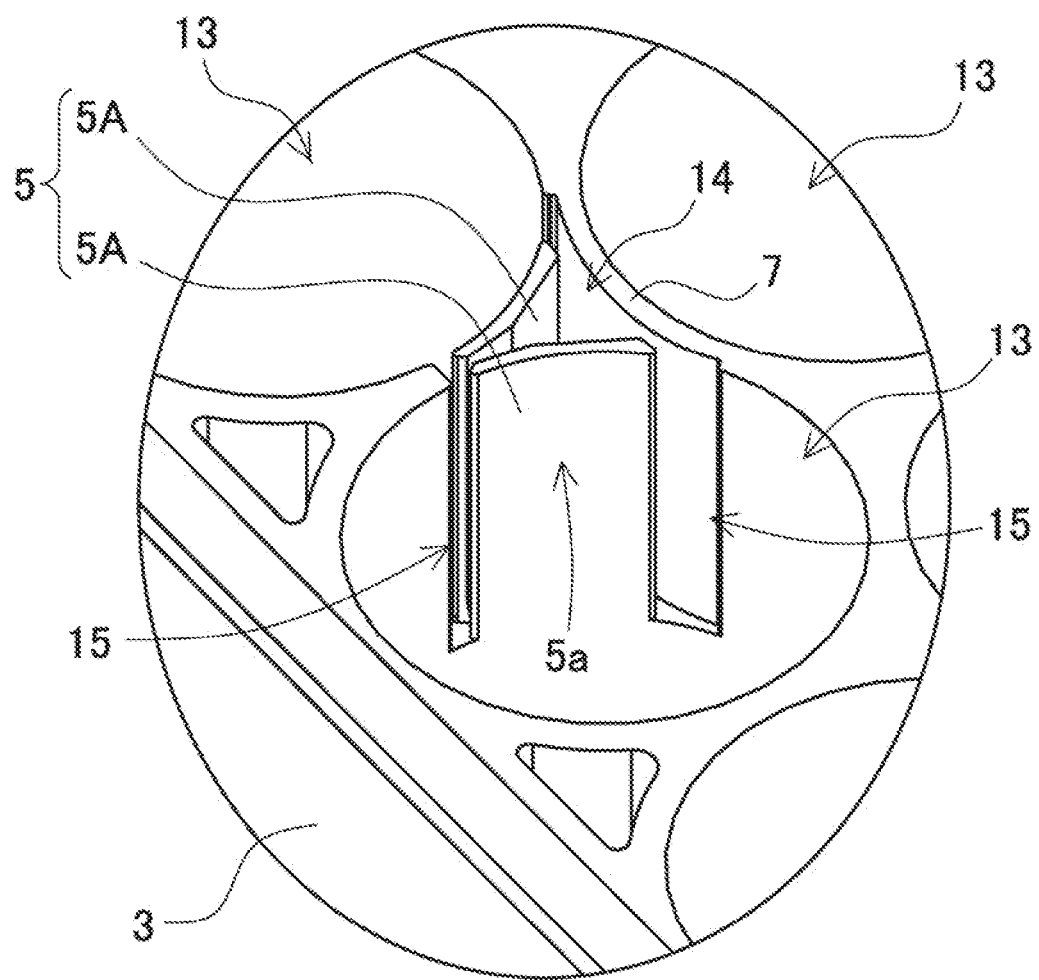
FIG. 7 is an enlarged perspective view of a holder body.

FIG. 6 is an enlarged cross-sectional view of a portion in which sub holder 4 is coupled to holder body 3 and push rod 6 thrusts stopper portions 5 against cylindrical batteries 1. As illustrated in FIGS. 4 to 6, in cell module 100, sub holder 4 is coupled to holder body 3, and each push rod 6 is inserted into back surfaces of stopper portions 5. Holder body 3 is provided with insertion spaces 14 for push rods 6. Each push rod 6 guided into insertion space 14 pushes out stopper portions 5 from back surfaces of stopper portions 5. Stopper portions 5 pressed from the back surfaces thrust front surfaces of stopper portions 5 against cylindrical batteries 1. The front surfaces of stopper portions 5 are thrust against cylindrical batteries 1 to inhibit the positional shifts of cylindrical batteries 1 and to prevent/suppress cylindrical batteries 1 from rotating. This is because frictional resistance between stopper portion 5 and cylindrical cell 1 increases. Stopper portions 5 are pressed from the back surfaces by push rod 6 and are elastically deformed. The elastically deformed front surfaces of stopper portions 5 are thrust against the surfaces of cylindrical batteries 1. The front surfaces of stopper portions 5 illustrated in FIGS. 6 and 7 are formed as curved surfaces 5a that go along the surfaces of cylindrical batteries 1. FIG. 7 is an enlarged perspective view illustrating stopper portions 5 provided on holder body 3. Stopper portions 5 bring the front surfaces into contact with the surfaces of cylindrical batteries 1 in a surface contact state, and closely adhere to the surfaces of cylindrical batteries 1 in a wide area, so that the positional shifts of cylindrical batteries 1 can be effectively inhibited, and the cylindrical batteries 1 can be prevented/suppressed from rotating.

The back surfaces of stopper portions 5, which are pressed by push rod 6, respectively have flat shapes as illustrated in FIG. 7. Stopper portions 5 having the flat back surfaces can reduce an imbalance of pressing force due to positional shifts of pressed portions pressed by push rod 6. This is because, even if positions pressed by push rod 6 move along the back surfaces of stopper portions 5, the back surfaces can be pressed by the same pressing force.

Figure 8:
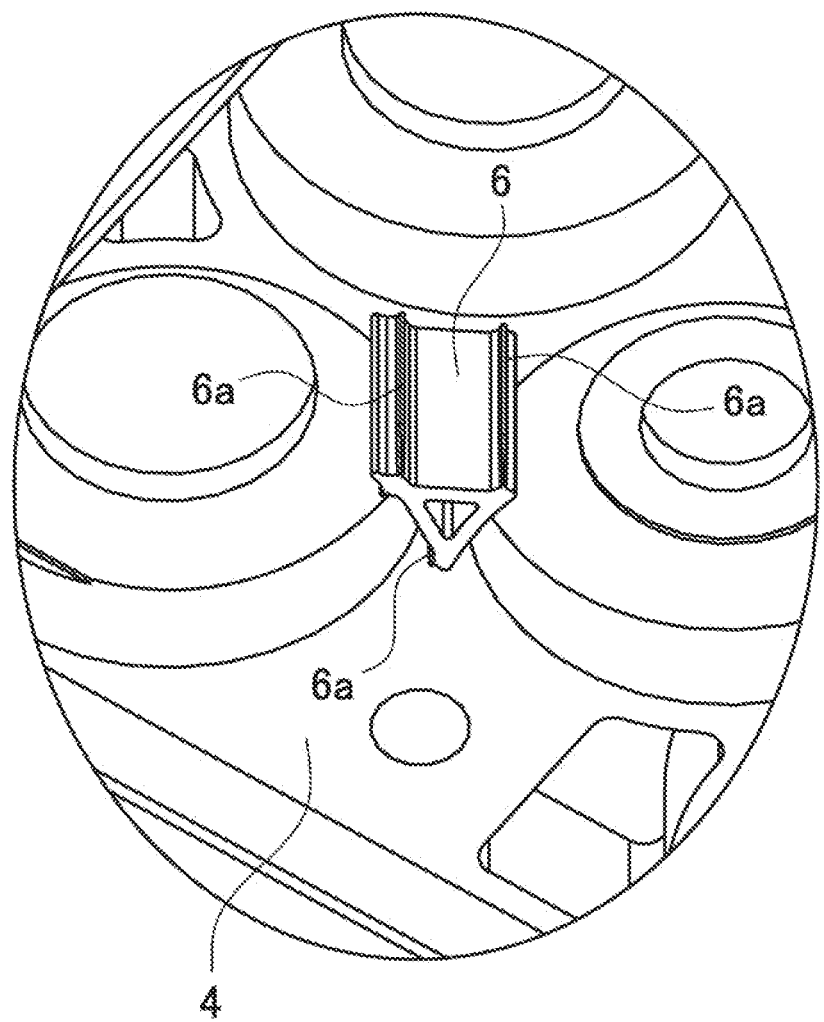
FIG. 8 is an enlarged bottom perspective view of a sub holder.
Figure 9:
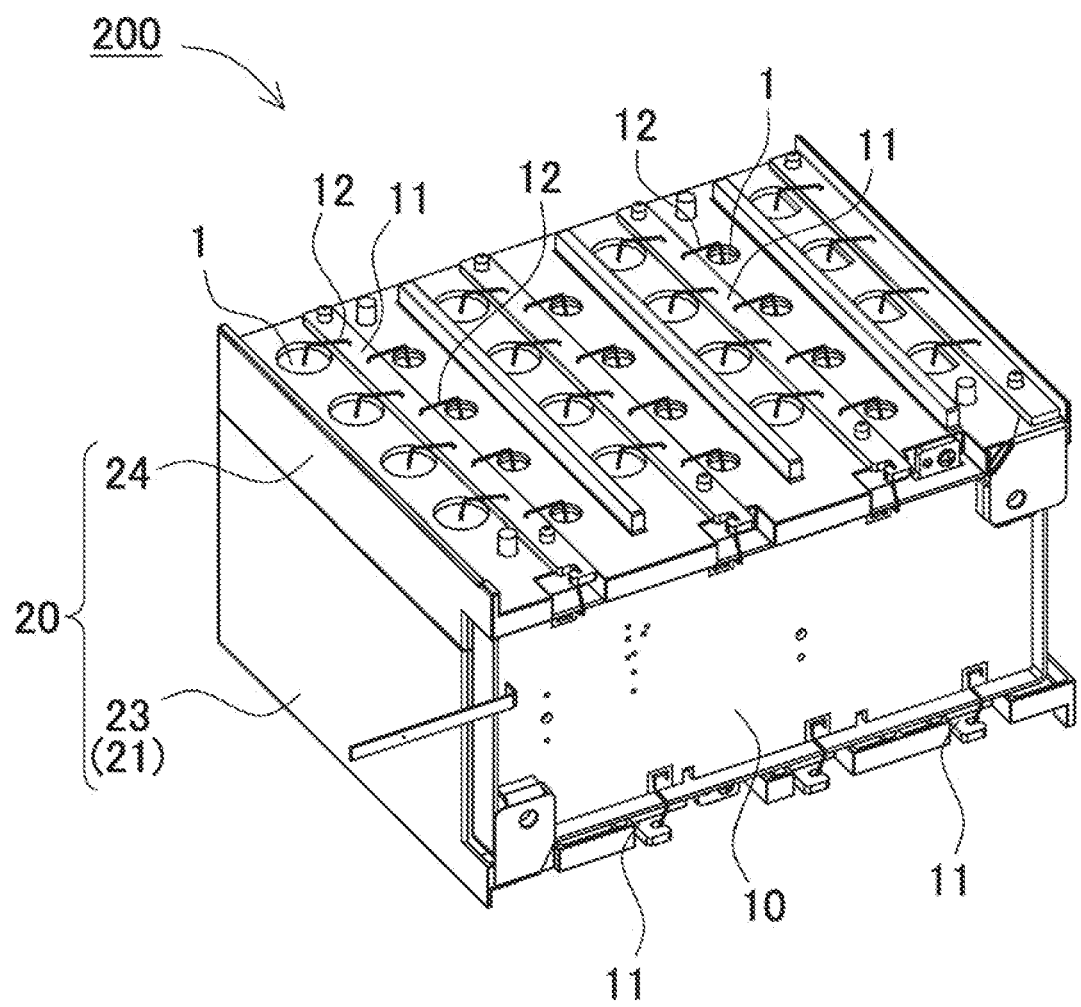
FIG. 9 is a perspective view of a cell module according to a second exemplary embodiment of the present invention.

FIG. 8 is an enlarged perspective view of push rod 6 provided on sub holder 4. Push rod 6 illustrated in FIG. 8 is provided with protrusions 6a that locally push out the back surfaces of stopper portion 5. Protrusions 6a are formed as ridges that extend in an insertion direction of push rod 6 such that push rod 6 can be smoothly inserted. A structure in which protrusions 6a of push rod 6 press the back surfaces of stopper portions 5 absorbs a dimensional error, thus making it possible to cause stopper portions 5 to surely prevent the positional shifts of cylindrical batteries 1, and to prevent/suppress the cylindrical batteries 1 from rotating. This is because each protrusion 6a and each back surface of stopper portion 5, which are brought into local contact with each other, are slightly deformed, thus making it possible to absorb the dimensional error.

Stopper portions 5 illustrated in FIG. 7 are elastic arms 5A elastically deformed and thrust against cylindrical batteries 1. Elastic arms 5A are provided integrally with holder body 3. Holder body 3 is provided with elastic arms 5A by integrally molding plastic. Holder body 3 manufactured by integrally molding elastic arms 5A can be mass-produced at low cost.

Holder body 3 is provided with holding spaces 13 into which cylindrical batteries 1 are inserted. Holding spaces 13 are provided in holder body 3 so as to arrange the plurality of cylindrical batteries 1 in multi-stages and multi-columns of a bale stack. Moreover, in order that cylindrical batteries 1 can be smoothly inserted into holding spaces 13, each of holding spaces 13 is molded so as to have an inner shape slightly larger than an outer shape of each of cylindrical batteries 1, for example, have the inner diameter larger than the outer diameter of each of cylindrical batteries 1 by 0.1 mm to 0.3 mm inclusive. As illustrated in the cross-sectional view of FIG. 5, holder body 3 that arranges cylindrical batteries 1 in multi-stages and multi-columns of a bale stack is provided with insertion spaces 14 for push rods 6 in regions each of which is surrounded by three cylindrical batteries 1. Cylindrical batteries 1 arranged in a bale stack are provided with insertion spaces 14 in each of which an entire shape is a substantially triangular prism shape. Each insertion space 14 is provided in a region surrounded by three cylindrical batteries 1 arranged in adjacent columns, in which, between cylindrical batteries 1 arranged in the same column, one cylindrical cell 1 in the adjacent column is arranged. Since each insertion space 14 is surrounded by three cylindrical batteries 1, insertion space 14 has a substantially triangular prism shape in which each side is curved inward.

Between insertion spaces 14 and cylindrical batteries 1, holder body 3 of FIGS. 4 and 7 is provided with stopper portions 5 as "pairs of stopper portions 5", which are composed of two elastic arms 5A pushing out the surfaces of two cylindrical batteries 1, such that the pair of stopper portions 5 have an inverse V shape in plan view. In each pair of stopper portions 5, rear ends of elastic arms 5A are integrally connected to holder body 3. Holder body 3 is provided with separation slits 15 along both side edges of stopper portions 5. Each separation slit 15 is formed into a shape of separating stopper portion 5 from holder body 3 and being easily elastically deformed by being pushed by push rod 6. Stopper portions 5 in FIG. 4 are rectangular elastic arms 5A elongated in the insertion direction of push rods 6, and each elastic arm 5A separates both side edges and a tip end edge from holder body 3, and couples a lower end edge integrally to holder body 3. Each elastic arm 5A has the both side edges separated from holder body 3 by separation slits 15, and has the tip end edge arranged on the surface of holder body 3 and separated from holder body 3. Since each elastic arm 5A has three sides separated from holder body 3, elastic arm 5A is elastically deformed by being pushed by push rod 6 from the back surface, and is thrust against cylindrical cell 1.

In holder body 3 illustrated in the cross-sectional view of FIG. 6 and the perspective view of FIG. 7, in each triangular prism insertion space 14 surrounded by three cylindrical batteries 1, a pair of stopper portions 5 are provided at opposite positions on two sides of such a triangular prism, and on the remaining one side, stopper portion 5 is not provided, but cover portion 7 that is not elastically deformed is provided. Stopper portion 5 is elastically deformed by push rod 6 inserted into insertion space 14 to press cylindrical cell 1, but cover portion 7 is arranged along the surface of cylindrical cell 1 without being elastically deformed. Each of cylindrical batteries 1 arranged in multi-stages and multi-columns is pressed by one stopper portion 5 to be arranged at a fixed position. Hence, holder body 3 has a pair of stopper portions 5 arranged thereon such that one stopper portion 5 can be pressed against each of all cylindrical batteries 1.

Since holder body 3 is provided with separation slits 15 on both side edges of each stopper portion 5, separation slits 15 expose a part of the surface of cylindrical cell 1 to insertion space 14. Holder body 3, in which three cylindrical batteries 1 are arranged around substantially triangular insertion space 14 and stopper portions 5 are provided on the surfaces of two cylindrical batteries 1, partially exposes the surfaces of two cylindrical batteries 1 to insertion space 14, and does not expose the surface of one cylindrical cell 1 to insertion space 14. This is because stopper portions 5 partially expose the surfaces of cylindrical batteries 1 to insertion space 14, and because cover portion 7 does not expose the surface of cylindrical cell 1 to insertion space 14. Two sets of cylindrical batteries 1 of which surfaces are partially exposed to insertion space 14 are connected in parallel to each other via bus bar 11. Cylindrical cell 1 of which surface is insulated by being covered with cover portion 7 and is not exposed to insertion space 14 is connected, via bus bar 11, in series to cylindrical batteries 1 of which surfaces are exposed. Cylindrical batteries 1 connected in parallel to each other do not need to be insulated because exterior cans of cylindrical batteries 1 have the same potential, and even if the surfaces of cylindrical batteries 1 are partially exposed to same insertion space 14, there occurs no harmful effect such as electric leakage. Cylindrical cell 1 connected in series has a potential difference in an exterior can, and therefore needs to be arranged in an insulated manner. This is because a harmful effect such as electric leakage occurs if insulation characteristics are deteriorated. Cylindrical cell 1 arranged inside cover portion 7 is covered with cover portion 7, and does not cause the surface to be exposed to insertion space 14. Hence, since this cylindrical cell 1 is arranged so as to be sufficiently insulated from insertion space 14, cylindrical cell 1 can be arranged in holder body 3 while preventing a harmful effect due to electric leakage.

In cell module 100 illustrated in FIG. 1, end face electrodes at both ends of each cylindrical cell 1 are connected to bus bar 11 via lead wires 12. Each bus bar 11 illustrated in the drawing is a plate-shaped metal sheet, and is arranged between the columns of cylindrical batteries 1 connected in parallel to each other. Bus bars 12 connect cylindrical batteries 1, which are arranged in the same column, in parallel to one another, and in addition, connect cylindrical batteries 1, which are placed in adjacent columns, in series to one another.

Sub holders 4 have push rods 6 arranged at positions of pressing stopper portions 5. Push rod 6 illustrated in the perspective view of FIG. 8 has a substantially triangular prism shape as a whole, and along tip end edges of the triangle, is provided with protrusions 6a that press the back surfaces of stopper portions 5. Protrusions 6a are provided as ridges that protrude on two sides of the triangle, and presses stopper portions 5 from the back surfaces.

In holder 2 illustrated in the above drawings, sub holders 4 are stacked on the top and bottom of holder body 3 in the drawings. This holder 2 has stopper portions 5 provided at both ends of each holding space 13 provided in holder body 3, and has a structure of holding both end portions of cylindrical batteries 1, which are accommodated in holder body 3, by stopper portions 5 in a state in which sub holders 4 are coupled to the top and bottom of holder body 3. Since this structure holds both ends of cylindrical batteries 1 by stopper portions 5, this structure has features that the positional shifts of cylindrical batteries 1 can be effectively inhibited, and that the cylindrical batteries 1 can be prevented/suppressed from rotating. However, the holder can also be provided with the stopper portion only on one side of the holding space provided in the holder body. In this case, the push rod can be provided only in the sub holder coupled to the side of the holder body, on which the stopper portion is provided. Further, the holder body may be divided into a plurality of divided holders by dividing the holder body in an axial direction of the cylindrical batteries.

Moreover, in cell module 100 described above, holder body 3 is provided with elastically deformed elastic arms 5A as stopper portions 5, and in the cell module of the present invention, a part or all of the holder body can be formed as a rubbery holder formed by molding a rubbery elastic body. In FIGS. 9 to 16, a cell module having this structure is illustrated as a cell module according to another exemplary embodiment of the present invention.

Cell module 200 illustrated in FIGS. 9 to 16 includes: a plurality of cylindrical batteries 1; holder 20 in which cylindrical batteries 1 are arranged in a parallel posture; bus bars 11 which connect cylindrical batteries 1 in series and in parallel to one another; and circuit board 10 that mounts thereon a protection circuit of cylindrical batteries 1. Holder 20 includes: holder body 23 having holding spaces 33 for cylindrical batteries 1; and sub holder 24 stacked on holder body 23.

Holder body 23 includes rubbery holder 22 formed by molding a rubbery elastic body. Rubbery holder 22 includes: holding spaces 32 in which cylindrical batteries 1 are arranged; and insertion spaces 34 into which push rods 26 protruding from sub holder 24 are inserted. Elastically deformable stopper portions 25 are formed between these insertion spaces 34 and surfaces of rubbery holder 22, which face cylindrical batteries 1. Sub holder 24 includes push rods 26 that are inserted into insertion spaces 34 of rubbery holder 22 in a state of being coupled to holder body 23 and elastically deform stopper portions 25 to push stopper portions 25 toward cylindrical batteries 1. In this holder 20, in a state of coupling sub holder 24 to holder body 23, push rods 26 inserted into insertion spaces 34 thrust stopper portions 25 against cylindrical batteries 1, and inhibit the positional shifts of cylindrical batteries 1 in holding spaces 33, and prevent/suppress cylindrical batteries 1 from rotating.

Figure 10:
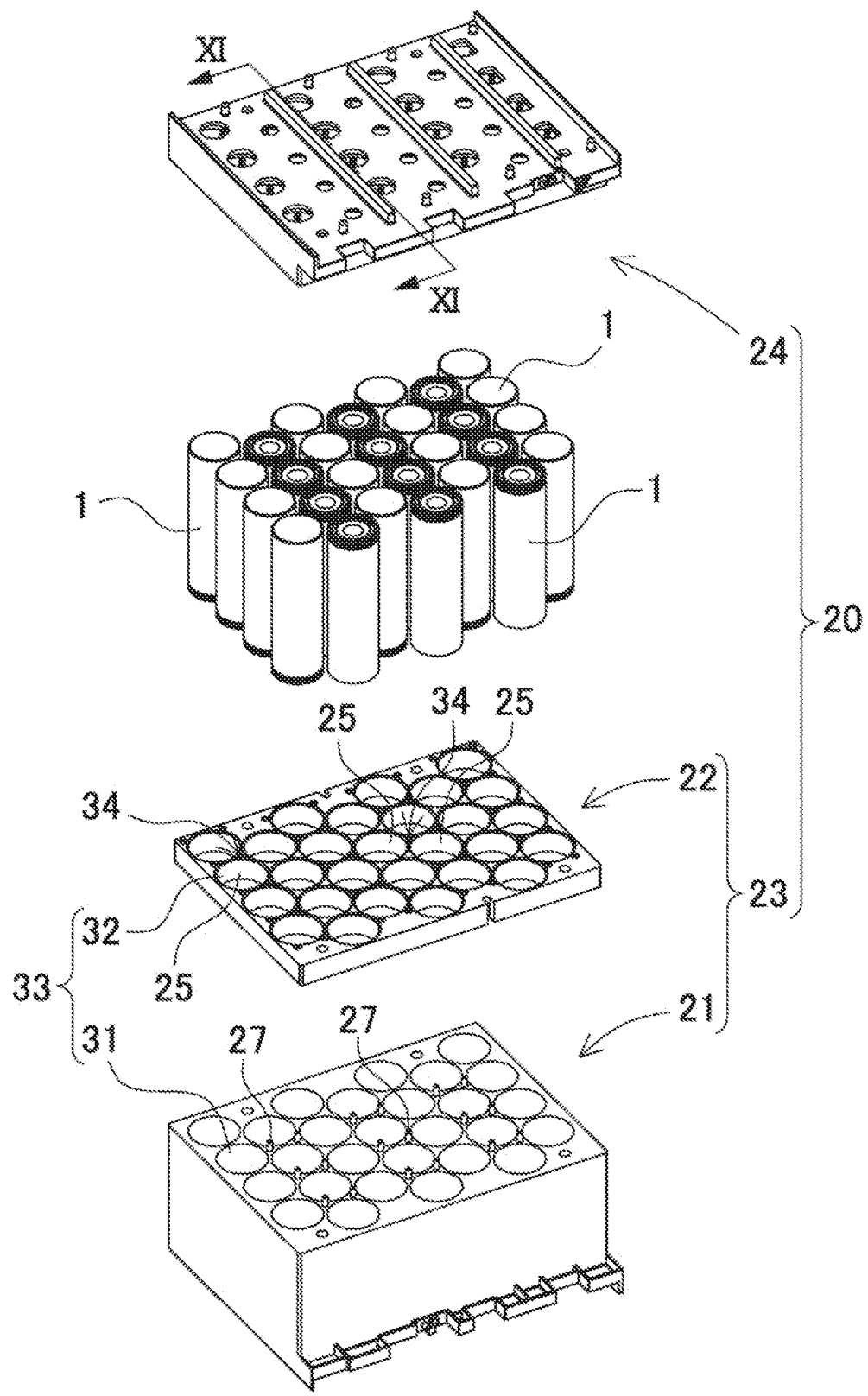
FIG. 10 is an exploded perspective view of a holder of the cell module illustrated in FIG. 9.
Figure 11:
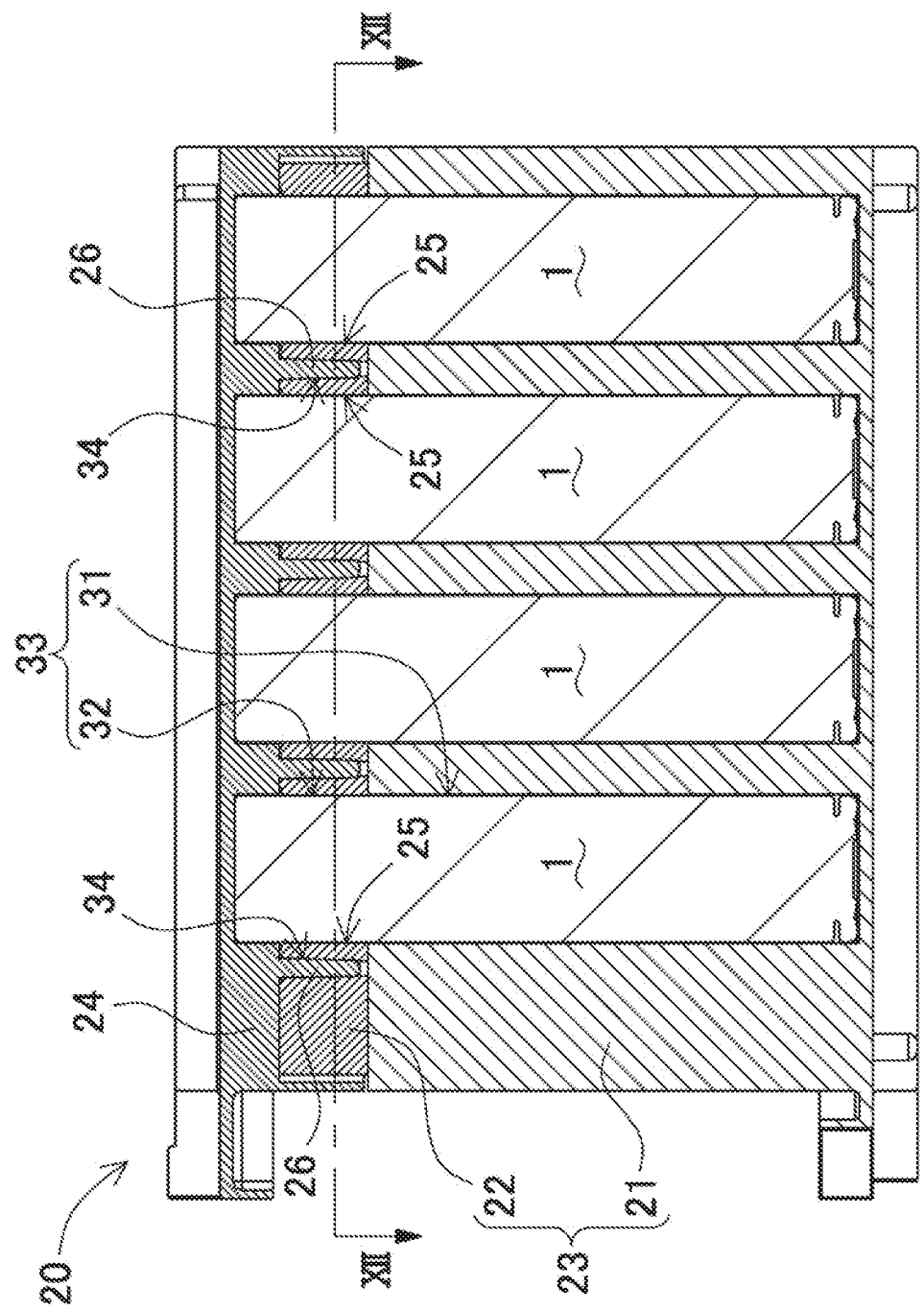
FIG. 11 is a vertical sectional view of the holder that accommodates cylindrical batteries, corresponding to a cross section taken along line XI-XI of FIG. 9.
Figure 12:
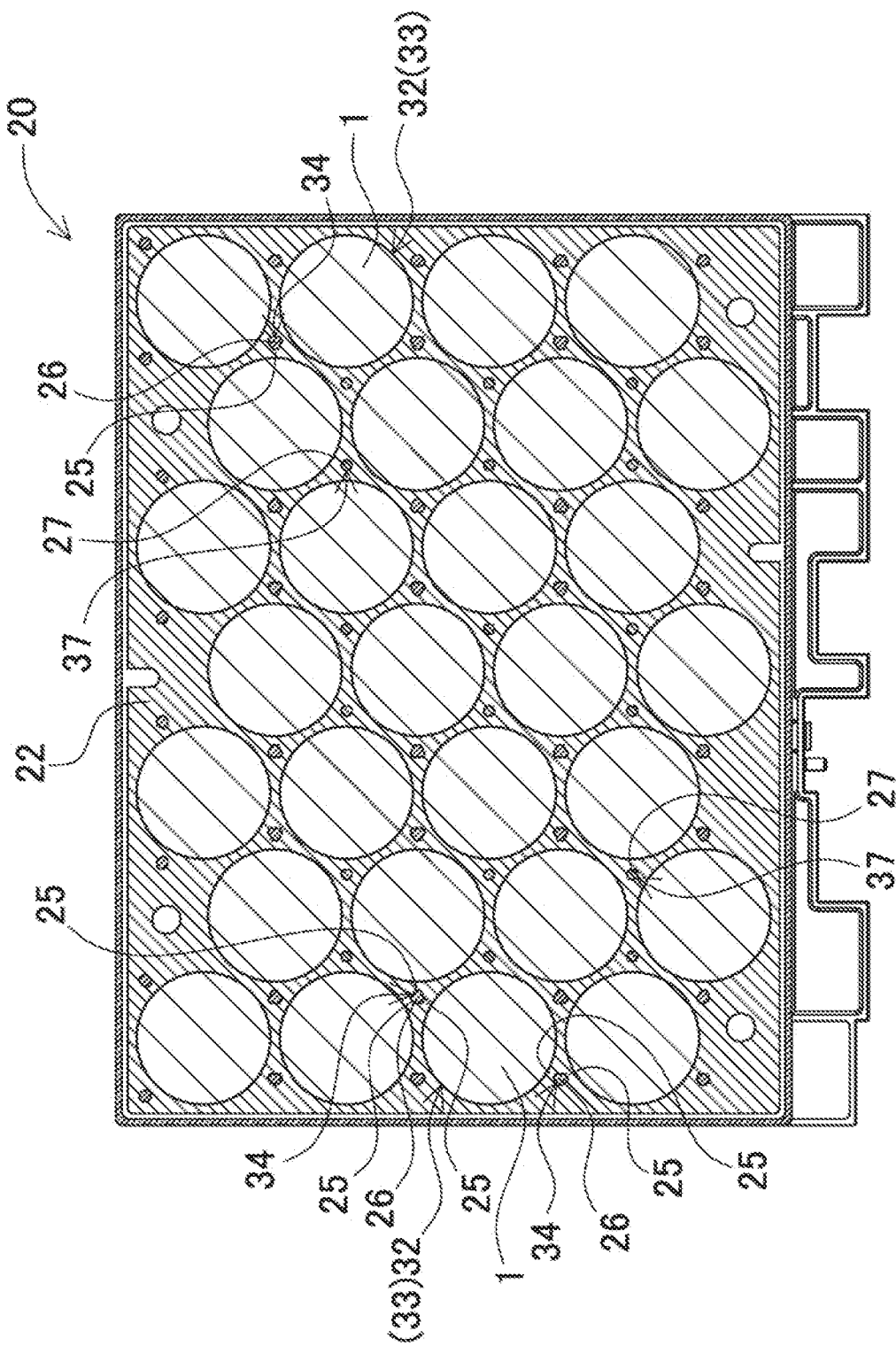
FIG. 12 is a cross-sectional view taken along line XII-XII of the holder illustrated in FIG. 11.

FIGS. 10, 12, and 16 are views illustrating a state in which sub holder 4 is coupled to holder body 3 and push rods 26 inserted into insertion spaces 34 of rubbery holder 22 thrust stopper portions 25 against cylindrical batteries 1. As illustrated in FIGS. 11 and 12, in cell module 200, sub holder 24 is coupled to holder body 23, and push rods 26 are inserted into insertion spaces 34 of rubbery holder 22. An outer shape of each of push rods 26 inserted into corresponding insertion space 34 is larger than an inner shape of each of insertion spaces 34, and in a state in which push rods 26 are inserted into insertion spaces 34, push rods 26 elastically deform stopper portions 25 located between insertion spaces 34 and surfaces of rubbery holder 22, which face cylindrical batteries 1, and press the surfaces of stopper portions 25 against cylindrical batteries 1. The surfaces of stopper portions 25 are thrust against cylindrical batteries 1 to inhibit the positional shifts of cylindrical batteries 1 and to prevent/suppress cylindrical batteries 1 from rotating. This is because frictional resistance between stopper portions 25 and cylindrical batteries 1 increases. Stopper portions 25 are pressed from back surfaces by push rods 26 and are elastically deformed. The elastically deformed surfaces of stopper portions 25 are thrust against the surfaces of cylindrical batteries 1.

Holder body 23 illustrated in FIGS. 10 and 11 includes: plastic holder 21 that holds respective cylindrical batteries 1 in a parallel posture; and rubbery holder 22 that is stacked on this plastic holder 21 and holds end portions of cylindrical batteries 1 inserted into plastic holder 21. Plastic holder 21 is provided with holding spaces 31 each of which accommodates almost the entire cylindrical cell 1 except one end portion. At positions facing holding spaces 31 provided in plastic holder 21, rubbery holder 22 is provided with holding spaces 32 into which the end portions of cylindrical batteries 1 are inserted. These holding spaces 31 and 32 are provided so as to arrange the plurality of cylindrical batteries 1 in multi-stages and multi-columns of a bale stack. Holding spaces 31 of plastic holder 21 and holding spaces 32 of rubbery holder 22 are provided at positions facing each other, and in a state in which rubbery holder 22 is stacked on plastic holder 21, columnar holding spaces 33 that go along the surfaces of cylindrical batteries 1 are formed of holding spaces 31 and 32 that are coupled to each other. In order that cylindrical batteries 1 can be smoothly inserted into holding spaces 33, each of holding spaces 33 is molded so as to have an inner shape slightly larger than an outer shape of each of cylindrical batteries 1, for example, have the inner diameter larger than the outer diameter of each of cylindrical batteries 1 by 0.1 mm to 0.3 mm inclusive.

Figure 13:
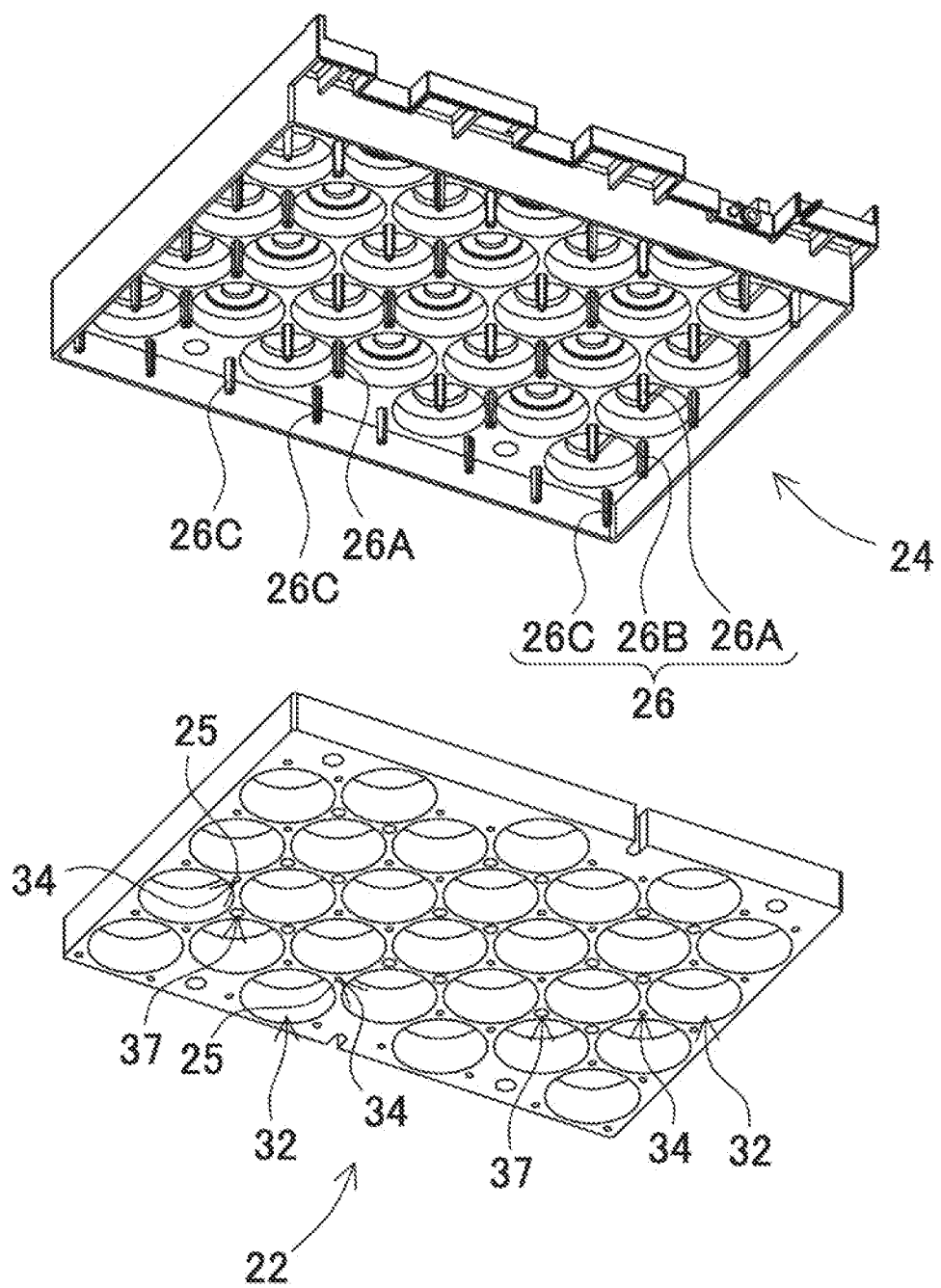
FIG. 13 is an exploded perspective view of a sub holder and a rubbery holder as viewed from below.

Moreover, in holder body 23, as illustrated in FIGS. 10, 12, and 13, in order that rubbery holder 22 can be coupled to a fixed position of plastic holder 21, coupling holes 37 are provided in rubbery holder 22, and plastic holder 21 is provided with positioning pins 27 inserted into coupling holes 37. Holder body 23 is provided with each of coupling holes 37 and each of positioning pins 27 in a region on an opposing surface of plastic holder 21 and rubbery holder 22, the region being surrounded by three cylindrical batteries 1 arranged in a bale stack. In a posture of protruding in the axial direction of cylindrical batteries 1 from an end surface of plastic holder 21, on which rubbery holder 22 is stacked, positioning pins 27 are provided on plastic holder 21 by being molded integrally therewith. In this holder body 23, rubbery holder 22 is coupled to the fixed position of plastic holder 21 in a state of guiding positioning pins 27, which protrude from the end surface of plastic holder 21, to coupling holes 37.

Rubbery holder 22 is formed by molding a rubbery elastic body into a plate shape having a predetermined thickness. Rubbery holder 22 illustrated in FIGS. 10, 12 and 13 is provided with insertion spaces 34, into which push rods 26 of sub holder 24 are inserted, along peripheries of holding spaces 32 formed in a circular shape in plan view. Rubbery holder 22 illustrated in the drawings has a structure in which two to four insertion spaces 34 are provided around one holding space 32 and one cylindrical cell 1 is pressed and held from a plurality of surrounding spots. Each of insertion spaces 34 illustrated in the drawings is a through hole opened through plate-shaped rubbery holder 22, and has a cylindrical shape as an inner shape. Insertion space 34 provided along the periphery of holding space 32 is preferably provided in a region surrounded by three cylindrical batteries 1. Moreover, insertion spaces 34 arranged along an outer periphery of rubbery holder 22 are provided so as to face valleys of cylindrical batteries 1 adjacent to each other and an outer circumference of one cylindrical cell 1. As described above, it is made possible to press and hold such an outer circumferential surface of one cylindrical cell 1 from a plurality of spots.

Rubbery holder 22 defines portions between insertion spaces 34 and surfaces of rubbery holder 22, which face cylindrical batteries 1, as elastically deformable stopper portions 25. In a state in which push rods 26 are inserted into insertion spaces 34, this rubbery holder 22 elastically deforms stopper portions 25 into a shape protruding toward cylindrical batteries 1, and presses the surfaces of cylindrical batteries 1. Hence, such a structure in which each of insertion spaces 34 is provided in the region surrounded by three cylindrical batteries 1 can cause each push rod 26 inserted into one insertion space 34 to protrude stopper portion 25 in a state of elastically deforming stopper portion 25 in three directions, and to press cylindrical batteries 1 facing stopper portion 25 in three directions. As described above, the structure in which a part of rubbery holder 22 molded of a rubbery elastic body is elastically deformed and pressed against the surfaces of cylindrical batteries 1 has a feature in that the rubbery elastic body having large frictional resistance can surely inhibit the positional shifts of the cylindrical batteries and can prevent/suppress the cylindrical batteries from rotating. The surfaces of stopper portions 25 illustrated in the drawings are formed as curved surfaces 25a that go along the surfaces of cylindrical batteries 1.

Figure 14:
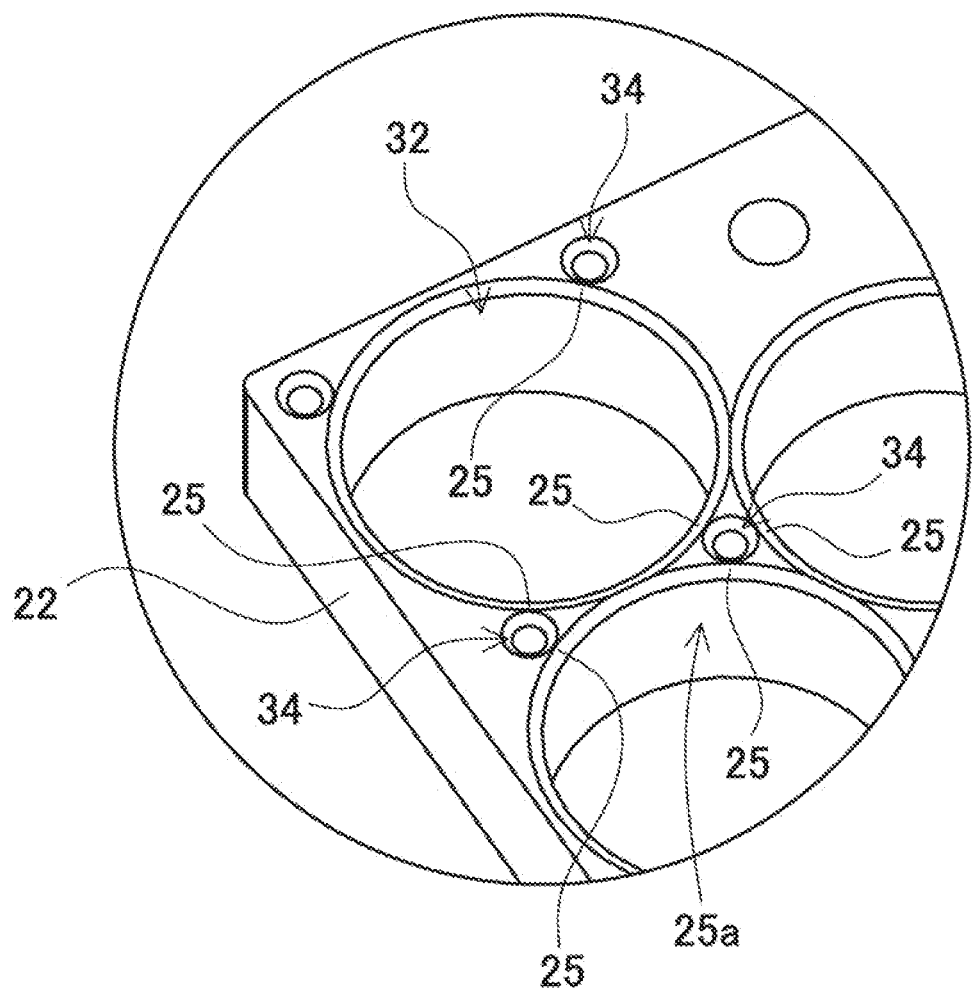
FIG. 14 is an enlarged perspective view of the rubbery holder.

FIG. 14 is a perspective view of rubbery holder 22. In rubbery holder 22 illustrated in the drawing, an opening edge portion of the through hole, which is each insertion space 34 into which push rod 26 is inserted, is formed as a tapered surface. This structure can cause push rod 26, which has an outer shape larger than the inner shape of insertion space 34, to be press-fitted while being smoothly guided.

Figure 15:
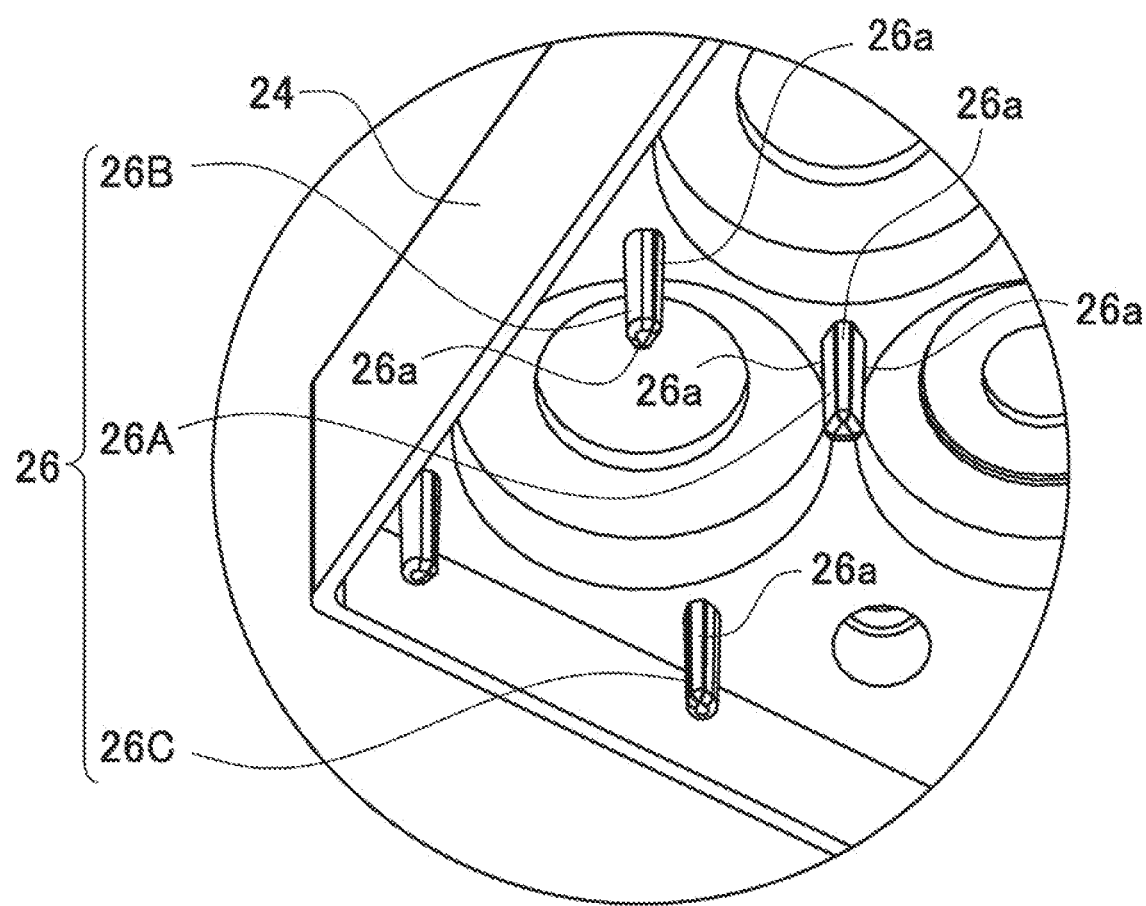
FIG. 15 is an enlarged bottom perspective view of the sub holder.

Sub holder 24 includes the plurality of push rods 26, which are inserted into insertion spaces 34 of rubbery holder 22 in a state of being coupled to holder body 23, by molding push rods 26 integrally therewith. FIG. 15 is an enlarged perspective view of push rods 26 provided on sub holder 24. Push rods 26 illustrated in FIG. 15 are provided with protrusions 26a, which locally push out the back surfaces of stopper portions 25 in a state of being press-fitted into insertion spaces 34, so that protrusions 26a protrude from the surfaces of columnar rod bodies. Protrusions 26a are formed as ridges that extend in an insertion direction of push rods 26 along the side surfaces of such columnar rod bodies such that push rods 26 can be smoothly inserted into insertion spaces 34, and that the surfaces of cylindrical cell cells 1 can be pressed in the axial direction by stopper portions 25. In push rods 26 illustrated in FIG. 16, protrusions 26a provided on outer circumferential surfaces of push rods 26 are caused to have a posture protruding toward centers of facing cylindrical batteries 1 such that stopper portions 25 can be surely elastically deformed toward facing cylindrical batteries 1. As illustrated in FIG. 16, push rods 26 provided with protrusions 26a protruding toward facing cylindrical batteries 1 have a feature of being capable of surely pressing stopper portions 25 toward the surfaces of cylindrical batteries 1.

Moreover, push rods 26 illustrated in FIGS. 15 and 16 change a number and orientation of protrusions 26a according to a number of cylindrical batteries 1, which are arranged around push rods 26, such that stopper portions 25 can be pressed toward the plurality of facing cylindrical batteries 1. Push rods 26 shown in FIGS. 15 and 16 include: first rods 26A each of which is provided with three linear protrusions 26a protruding in three directions; second rods 26B each of which is provided with two linear protrusions 26a protruding in two directions; and third rods 26C each of which is provided with one linear protrusion 26a protruding in one direction. Each of first rods 26A is inserted into insertion space 34 arranged in the region surrounded by three cylindrical batteries 1, elastically deforms stopper portion 25 made of a rubbery elastic body, and presses three cylindrical batteries 1. Each of second rods 26B is inserted into insertion space 34 arranged between two cylindrical batteries 1, elastically deforms stopper portion 25 made of a rubbery elastic body, and presses two cylindrical batteries 1. Each of third rods 26C is inserted into insertion space 34 facing one cylindrical cell 1, elastically deforms stopper portion 25 made of a rubbery elastic body, and presses one cylindrical cell 1. As described above, push rods 26 having predetermined shapes are inserted into the plurality of insertion spaces 34 arranged around the holding spaces 32, whereby the surfaces of respective cylindrical batteries 1 are pressed from a plurality of peripheral spots, thus making it possible to ideally inhibit the positional shifts of the cylindrical batteries, and to prevent/suppress the cylindrical batteries from rotating.

Holder body 23 illustrated in the above drawings has a structure in which rubbery holder 22 is stacked only on one side (upper side in the drawings) of plastic holder 21. Hence, holder 20 illustrated in these drawings has a structure in which sub holder 24 is coupled only to one side of holder body 23. This holder 20 has a simple structure as a whole, and holds the end portions of cylindrical batteries 1 accommodated in holder body 23 by stopper portions 25, thus making it possible to prevent the positional shifts of cylindrical batteries 1, and to prevent/suppress cylindrical batteries 1 from rotating. However, as a structure of stacking rubbery holders on both sides of a plastic holder, the holder can also adopt a structure of stacking the sub holders on both sides of the holder body. Since this structure holds both ends of the cylindrical batteries by the stopper portions, this structure has features that the positional shifts of the cylindrical batteries can be effectively inhibited, and that the cylindrical batteries can be prevented/suppressed from rotating.

INDUSTRIAL APPLICABILITY

The present invention is a cell module in which cylindrical batteries are arranged at fixed positions by a holder, and particularly, can be suitably used as a cell module capable of inhibiting positional shifts and rotation of the cylindrical batteries.

REFERENCE MARKS IN THE DRAWINGS

100, 200 cell module
2 cylindrical cell
3 holder
3 holder body
4 sub holder
5 stopper portion
5A elastic arm
5a curved surface
6 push rod
6a protrusion
7 cover portion
10 circuit board
11 bus bar
12 lead wire
13 holding space
14 insertion space
15 separation slit
20 holder
21 plastic holder
22 rubbery holder
23 holder body
24 sub holder
25 stopper portion
25a curved surface
26 push rod
26a protrusion
26A first rod
26B second rod
26C third rod
27 positioning pin
31 holding space
32 holding space
33 holding space
34 insertion space
37 coupling hole

The invention claimed is:
1. A cell module comprising:
a plurality of cylindrical batteries; and
a holder holding the plurality of cylindrical batteries in a parallel posture, wherein the holder includes:
a holder body having holding spaces for arranging the plurality of cylindrical batteries at fixed positions; and
a sub holder stacked on the holder body,
the holder body includes stopper portions, the stopper portions each being deformed toward a surface of a corresponding one of the plurality of cylindrical batteries arranged in a corresponding one of the holding spaces,
the sub holder includes push rods, the push rods each pushing a corresponding one of the stopper portions to a corresponding one of the plurality of cylindrical batteries when the sub holder is coupled to the holder body, and
the sub holder is configured to be coupled to the holder body, such that each of the push rods thrusts and move a corresponding one of the stopper portions toward and against a surface of a corresponding one of the plurality of cylindrical batteries arranged in a corresponding one of the holding spaces, wherein a pressure exerted by the stopper portions against the plurality of cylindrical batteries is configured to increase upon coupling of the sub holder to the holder body.

2. The cell module according to claim 1, wherein the cell module has a structure in which, when the sub holder is coupled to the holder body, each of the push rods is inserted into back surface of a corresponding one of the stopper portions, press each of the stopper portions from the back surface, and thrusts and presses front surface of the corresponding one of the stopper portions against the corresponding one of the plurality of cylindrical batteries.

3. The cell module according to claim 1, wherein the front surface of each of the stopper portions is curved surfaces that go along the surface of the corresponding one of the plurality of cylindrical batteries.

4. The cell module according to claim 1, wherein each of the push rods of the sub holder have a corresponding one of protrusions that locally push out the back surface of the corresponding one of the stopper portions.

5. The cell module according to claim 4, wherein each of the back surfaces of the stopper portions is composed by forming, into a flat shape, a corresponding one of pressed surfaces pressed by the corresponding one of the protrusions provided on the push rods.

6. The cell module according to claim 1, wherein the stopper portions are elastic arms deformed and pressed against the cylindrical batteries, and the holder body is made of plastic composed by integrally molding the elastic arms.

7. The cell module according to claim 1, wherein
the holder body includes insertion space having a substantially triangular prism shape as a whole, the insertion space being provided in a region surrounded by three cylindrical batteries arranged in adjacent columns among columns of the plurality of cylindrical batteries, the plurality of cylindrical batteries being arranged in a bale stack and between the cylindrical batteries arranged in a same column, one of the plurality of cylindrical batteries in an adjacent column is arranged, and
between the insertion space and the three cylindrical batteries, two of the stopper portions that push out surfaces of two of the plurality of cylindrical batteries are arranged as a pair of stopper portions in an inverse V shape in plan view, and are integrally coupled to the holder body.

8. The cell module according to claim 7, wherein the holder body is provided with separation slits along both side edges of the stopper portions, each of the separation slits separating the pair of stopper portions from the holder body.

9. The cell module according to claim 7, wherein
between the insertion space and the two of the plurality of cylindrical batteries, two of the stopper portions that press the surfaces of the two of the plurality of cylindrical batteries and a cover portion that covers the surface of one of the plurality of cylindrical batteries are provided integrally with the holder body, and
the cover portion has both side edges integrally coupled to the holder body.

10. The cell module according to claim 9, wherein
in three of the plurality of cylindrical batteries arranged around the insertion space, two of the three of cylindrical batteries pressed by the stopper portions are connected in parallel to each other, and
the two of the plurality of cylindrical batteries pressed by the stopper portions and one of the plurality of cylindrical batteries arranged inside the cover portion are connected in series to each other.

11. The cell module according to claim 1, wherein
the holder body includes a rubbery holder formed by molding a rubbery elastic body,
the rubbery holder has holding spaces for arranging the plurality of cylindrical batteries, and insertion spaces for the push rods,
portions between the insertion spaces and surfaces of the rubbery holder, the surfaces facing the plurality of cylindrical batteries, are defined as elastically deformable stopper portions, and
the elastically deformable stopper portions in which the push rods are inserted into the insertion spaces and are thrust and pressed against the surfaces of the plurality of cylindrical batteries.

12. The cell module according to claim 11, wherein the holder body has a stacked structure of the rubbery holder and a plastic holder.

13. The cell module according to claim 11, wherein
an inner surface of one of the holding spaces has a cylindrical shape that goes along the surface of a corresponding one of the plurality of cylindrical batteries,
an outer shape of a corresponding one of the push rods is larger than an inner shape of a corresponding one of the insertion space, and
the corresponding one of the push rods is inserted into the corresponding one of the insertion spaces, and the elastically deformable stopper portions are thrust against the surfaces of the cylindrical batteries.

14. The cell module according to claim 11, wherein the push rods have protrusions that protrude toward the cylindrical batteries arranged to face the stopper portions.

* * * * *